United States Patent
Ho et al.

(10) Patent No.: US 11,456,798 B2
(45) Date of Patent: Sep. 27, 2022

(54) IMU-ASSISTED POLARIZATION DIVISION MULTIPLEXED MIMO WIRELESS COMMUNICATION

(71) Applicant: Sony Corporation, Tokyo (JP)

(72) Inventors: Zuleita Ho, Lund (SE); Kun Zhao, Malmö (SE); Anders Berggren, Lund (SE); Erik Bengtsson, Eslöv (SE); Olof Zander, Södra Sandby (SE); Thomas Bolin, Lund (SE); Fredrik Rusek, Eslöv (SE)

(73) Assignee: Sony Group Corporation, Tokyo (JP)

( * ) Notice: Subject to any disclaimer, the term of this patent is extended or adjusted under 35 U.S.C. 154(b) by 108 days.

(21) Appl. No.: 17/259,000

(22) PCT Filed: Jul. 11, 2019

(86) PCT No.: PCT/EP2019/068699
§ 371 (c)(1),
(2) Date: Jan. 8, 2021

(87) PCT Pub. No.: WO2020/011930
PCT Pub. Date: Jan. 16, 2020

(65) Prior Publication Data
US 2021/0143892 A1    May 13, 2021

(30) Foreign Application Priority Data
Jul. 12, 2018    (SE) .................................... 1830217-4

(51) Int. Cl.
*H04B 7/10*    (2017.01)
*H04B 7/0452*    (2017.01)
(Continued)

(52) U.S. Cl.
CPC ............. *H04B 7/10* (2013.01); *H04B 7/0452* (2013.01); *H04B 7/0456* (2013.01); *H04B 7/0634* (2013.01)

(58) Field of Classification Search
CPC ...... H04B 7/10; H04B 7/0452; H04B 7/0456; H04B 7/0634
See application file for complete search history.

(56) References Cited

U.S. PATENT DOCUMENTS

| 9,882,679 B2* | 1/2018 | Pullela .................. H04L 1/0091 |
| 11,070,263 B2* | 7/2021 | Li ........................ H04B 7/0695 |
| 2013/0273870 A1 | 10/2013 | Shi |

FOREIGN PATENT DOCUMENTS

| WO | 2007090424 A1 | 8/2007 |
| WO | 2012176217 A1 | 12/2012 |
| WO | 2015008801 A1 | 1/2015 |

OTHER PUBLICATIONS

International Search Report and Written Opinion from corresponding International Application No. PCT/EP2019/068699, dated Oct. 11, 2019, 13 pages.

(Continued)

*Primary Examiner* — Vineeta S Panwalkar
(74) *Attorney, Agent, or Firm* — Tucker Ellis LLP

(57) ABSTRACT

Methods (10, 30) and devices (20, 40) for performing radio transmissions in a wireless communication network are provided. A method (30) associated with a wireless terminal (40, 40A) which performs radio transmissions in the wireless communication network comprises: receiving (31) a multiple input multiple output, MIMO, transmission from an access node (20) of the wireless communication network; estimating (32) a spatial orientation (θ, (φ)) of an antenna array (42) of the wireless terminal (40, 40A) based on measurements performed by at least one sensor (43) of the wireless terminal (40, 40A); and based on the estimated (Continued)

spatial orientation (θ, (φ)), filtering out (33) a polarization crosstalk from the received MIMO transmission, the polarization crosstalk being associated with the spatial orientation (θ, (φ)) of the antenna array (42) of the wireless terminal (40, 40A).

18 Claims, 3 Drawing Sheets

(51) Int. Cl.
  *H04B 7/0456* (2017.01)
  *H04B 7/06* (2006.01)

(56) References Cited

OTHER PUBLICATIONS

Kwon, Seok-Chul et al: "Polarization Division Multiple Access on NLoS Wide-Band Wireless Fading Channels", IEEE Transactions on Wireless Communications, vol. 13, No. 7, pp. 3726-3737, dated Jul. 1, 2014.
Swedish Office Action and Search Repod from corresponding Swedish Application No. 1830217-4, dated Jan. 30, 2019, 8 pages.
Lee, Sangheon et al., "Implementation of Polarization Matching Technique for Polarization Division Multiple Access", IEEE 85th Vehicular Technology Conference (VTC Spring); dated Jun. 4, 2017, 5 pages.

\* cited by examiner

IMU-ASSISTED POLARIZATION DIVISION MULTIPLEXED MIMO WIRELESS COMMUNICATION

FIELD OF THE INVENTION

Various embodiments of the invention relate to methods and devices for IMU-assisted polarization division multiplex in a wireless communication network, in particular involving multiple input multiple output, MIMO, wireless transmission.

BACKGROUND OF THE INVENTION

3GPP 5G standardization associated with spectrum bands in a millimeter wave range, e.g. above 6 GHz, has to deal with challenges such as, for instance, that transmission at these bands suffers from high path losses. This may be overcome by way of MIMO wireless transmission, which enables highly directional beams, or spatial channels, that focus transmitted radio frequency energy.

Establishing such spatial channels in multiple directions enables spatial reuse of time/frequency/code resources. Conventionally, a spatial channel associated with a particular time/frequency/code resource only serves a single user/terminal.

Polarization division multiplexing, PDM, may be used to serve multiple users/terminals based on a particular spatial channel and a particular time/frequency/code resource. However, multi-user MIMO requires appropriately designed precoding vectors each time the communication channel changes, for example due to rotations of the involved terminals around the direction of wave propagation, implying frequent and overhead-heavy control signalling between the involved transmission endpoints.

BRIEF SUMMARY OF THE INVENTION

In view of the above, there is a need in the art for maintaining polarization orthogonality of polarization division multiplexed MIMO transmissions serving multiple users/terminals via a particular spatial channel associated with a particular time/frequency/code resource.

This underlying object of the invention is solved by the methods and devices as defined by the independent claims. Preferred embodiments of the invention are set forth in the dependent claims.

According to a first aspect, a method of performing radio transmissions in a wireless communication network is provided. The method comprises, in a wireless terminal, steps of: Receiving a multiple input multiple output, MIMO, transmission from an access node of the wireless communication network; Estimating a spatial orientation of an antenna array of the wireless terminal based on measurements performed by at least one sensor of the wireless terminal; and based on the estimated spatial orientation: Filtering out a polarization crosstalk from the received MIMO transmission. The polarization crosstalk is associated with the spatial orientation of the antenna array of the wireless terminal.

The MIMO transmission may use a first set of time-frequency resources, a first MIMO spatial channel, and a first receive polarization state. The polarization crosstalk may be associated with a further MIMO transmission by the access node. This further MIMO transmission may use a second set of time-frequency resources which at least partially overlaps the first set of time-frequency resources, a second MIMO spatial channel which at least partially overlaps the first MIMO spatial channel, and a second receive polarization state which differs from the first receive polarization state.

The step of filtering out the polarization crosstalk based on the estimated spatial orientation may further comprise a step of: Filtering out the polarization crosstalk based on a terminal-specific filter function using the estimated spatial orientation as an input.

The filter function may be pre-configured in the wireless terminal.

The filter function may comprise a filter matrix.

The method may further comprise a step of: Determining a condition of an channel matrix representing the filtered channel.

The method may further comprise, in response to determining that the channel matrix is ill-conditioned, a step of: triggering the access node to improve an isolation of the MIMO transmissions.

The channel matrix may be ill-conditioned if a condition number of an inverse of the filter matrix (R) exceeds a condition number threshold.

The channel matrix may be ill-conditioned if an overall power of the inverse of the filter matrix (R) is less than an overall power threshold.

The step of triggering the access node to improve an isolation of the MIMO transmissions may further comprise a step of: Triggering the access node to use a different first set of time-frequency resources.

The step of triggering the access node to improve an isolation of the MIMO transmissions may further comprise: Triggering the access node to use different precoding vectors for the MIMO transmissions.

According to a second aspect, a wireless terminal is provided, which comprises: at least one sensor; an antenna array having antenna elements being associated with respective ones of two mutually orthogonal polarization planes; and a processor being arranged for performing steps of: Receiving a multiple input multiple output, MIMO, transmission from an access node of the wireless communication network; Estimating a spatial orientation of the antenna array of the wireless terminal based on measurements performed by the at least one sensor of the wireless terminal; and Based on the estimated spatial orientation, filtering out a polarization crosstalk from the received MIMO transmission. The polarization crosstalk is associated with the spatial orientation of the antenna array of the wireless terminal.

The wireless terminal may be arranged for performing the method according to various embodiments.

According to a third aspect, a method of controlling radio transmissions in a wireless communication network is provided. The method comprises, in an access node of the wireless communication network, steps of: Controlling a first multiple input multiple output, MIMO, transmission between the access node and a first wireless terminal to use a first set of time-frequency resources, to use a first MIMO spatial channel, and to use a first transmit polarization state; and Controlling a second MIMO transmission between the access node and a second wireless terminal to use a second set of time-frequency resources which at least partially overlaps the first set of time-frequency resources, to use a second MIMO spatial channel which at least partially overlaps the first MIMO spatial channel, and to use a second transmit polarization state which differs from the first transmit polarization state. The controlling of the MIMO transmissions comprises precoding the MIMO transmissions to allow for a filtering of mutual polarization crosstalk of the MIMO transmissions. The respective polarization crosstalk is associated with a spatial orientation of an antenna array of the respective wireless terminal.

The step of precoding the MIMO transmissions may further comprise a step of: The first MIMO transmission being mapped into a null-space of a second channel matrix of the second MIMO transmission, and the second MIMO transmission being mapped into a null-space of a first channel matrix of the first MIMO transmission.

The method may further comprise a step of: Receiving, from any one of the wireless terminals, a trigger to improve an isolation of the MIMO transmissions.

The step of receiving, from any one of the wireless terminals, a trigger to improve an isolation of the MIMO transmissions may further comprise a step of: Receiving a trigger to use a different set of time-frequency resources.

The step of receiving, from any one of the wireless terminals, a trigger to improve an isolation of the MIMO transmissions may further comprise a step of: Receiving a trigger to use different precoding vectors for the MIMO transmissions.

According to a fourth aspect, an access node of a wireless communication network is provided, which access node comprises a processor being arranged for performing steps of: Controlling a first multiple input multiple output, MIMO, transmission between the access node and a first wireless terminal to use a first set of time-frequency resources, to use a first MIMO spatial channel, and to use a first transmit polarization state; and Controlling a second MIMO transmission between the access node and a second wireless terminal to use a second set of time-frequency resources which at least partially overlaps the first set of time-frequency resources, to use a second MIMO spatial channel which at least partially overlaps the first MIMO spatial channel, and to use a second transmit polarization state which differs from the first transmit polarization state. The controlling of the MIMO transmissions comprises precoding the MIMO transmissions to allow for a filtering of mutual polarization crosstalk of the MIMO transmissions from each other. The respective polarization crosstalk is associated with a spatial orientation of an antenna array of the respective wireless terminal.

The access node may further comprise an antenna array having antenna elements being associated with respective ones of two mutually orthogonal polarization planes.

The access node may be arranged for performing the method of various embodiments.

BRIEF DESCRIPTION OF THE DRAWINGS

Embodiments of the invention will be described with reference to the accompanying drawings, in which the same or similar reference numerals designate the same or similar elements.

DETAILED DESCRIPTION OF EMBODIMENTS

Figure 1:
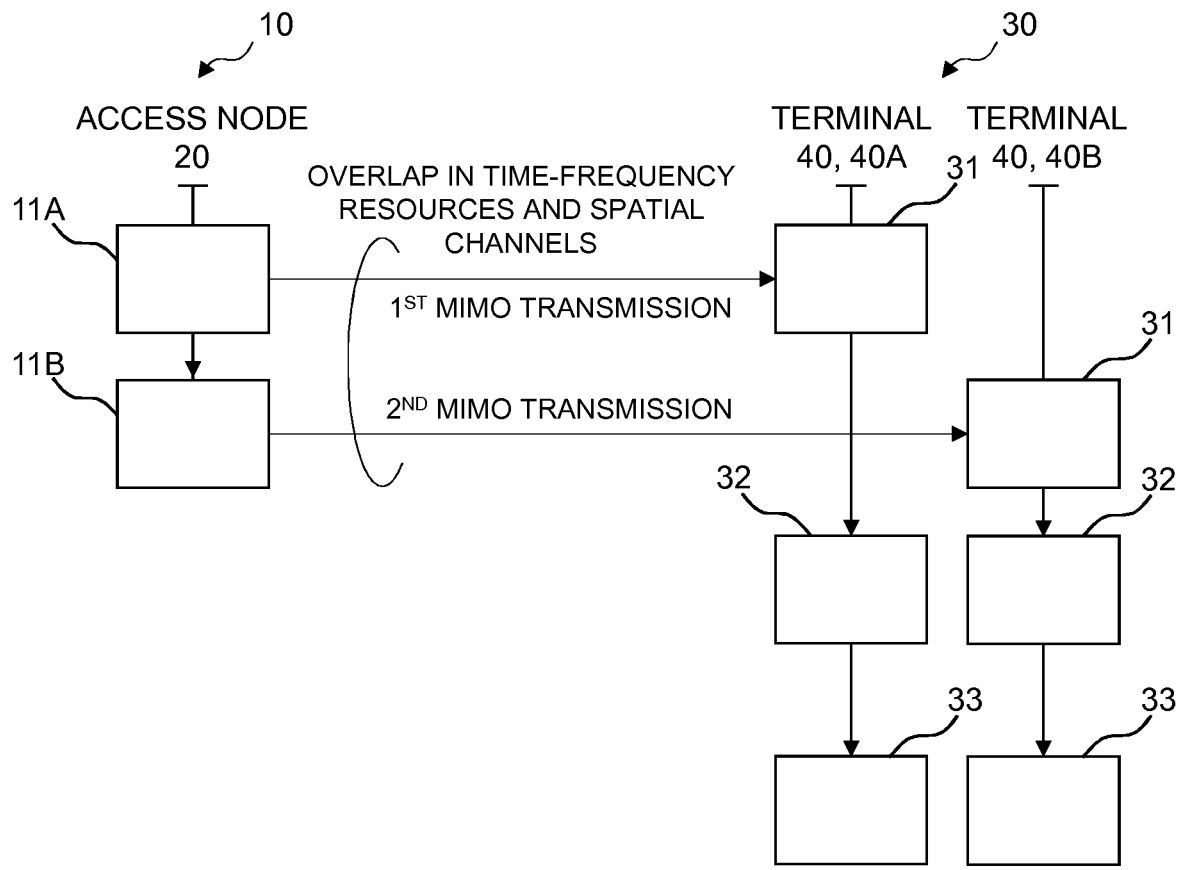
FIG. 1 illustrates a method 10 of controlling radio transmissions in a wireless communication nication network by an access node 20, and an interacting method 30 of performing radio transmissions in a wireless communication network by wireless terminals 40A, 40B.

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art.

FIG. 1 illustrates schematically a multi-user MIMO transmission system, involving MIMO transmissions between an access node 20 on its left-hand side, using a method 10 of controlling radio transmissions in a wireless communication network, and first and second wireless terminals 40A, 40B on its right-hand side, respectively performing radio transmissions in a wireless communication network according to a method 30. All entities are dually polarized, meaning that there are two input signals (the access node 20 transmitting on two mutually orthogonal polarization planes) and foru output signals (the respective wireless terminal 40A, 40B receiving on two mutually orthogonal polarization planes).

At step 11A of the method 10, the access node 20 controls 11A a first multiple input multiple output, MIMO, transmission between the access node 20 and a first wireless terminal 40, 40A to use a first set of time-frequency resources, to use a first MIMO spatial channel, and to use a first transmit polarization state.

At step 11B of the method 10, the access node 20 controls 11B a second MIMO transmission between the access node 20 and a second wireless terminal 40, 40B to use a second set of time-frequency resources which at least partially overlaps the first set of time-frequency resources, to use a second MIMO spatial channel which at least partially overlaps the first MIMO spatial channel, and to use a second transmit polarization state which differs from the first transmit polarization state.

Thus, the transmit beam of the access node 20 is the same for both wireless terminals 40A, 40B in terms of both spatial channel and time-frequency resource. It is assumed that the wireless terminals 40A, 40B have established their respective receive beams.

The controlling steps 11A, 11B of the method 10, which may be carried out concurrently, comprise precoding the first and second MIMO transmissions to allow for a filtering of mutual polarization crosstalk of the MIMO transmissions by the corresponding receiving wireless terminal 40A, 40B.

The polarization crosstalk is associated with a spatial orientation $\theta$, $\phi$ of an antenna array 42 of the respective wireless terminal 40A, 40B, and with a further (i.e., the second) MIMO transmission by the access node 20 to a further (the second) wireless terminal 40, 40B.

Precoding the MIMO transmissions may further comprise that the first MIMO transmission is mapped into a null-space of a second channel matrix $H_2$ of the second MIMO transmission, and that the second MIMO transmission is mapped into a null-space of a first channel matrix $H_1$ of the first MIMO transmission.

First, this requires the access node 20 to acquire channel state, i.e. respective channel matrices $H_{1/2}$ for downlink communication to the respective wireless terminal 40A, 40B through either one of
   a) downlink training, where feedback is provided to the access node 20, or
   b) uplink training (e.g., by means of SRS signals), by assuming channel reciprocity.

Second, system parameters $w_{1/2}$ (compensation matrix) and $f_{1/2}$ (precoding vectors) need to be determined in a way that implies interference-free MIMO transmissions.

The compensation matrices $w_{1/2}$ are used by the access node 20 as well as by the receiving wireless terminals 40A, 40B and determined as follows (more details further below):

$$w_1 = [1 - i] R^{-1}(\theta_1, \phi_1) \quad (1)$$

$$w_2 = [-i 1] R^{-1}(\theta_1, \phi_2) \quad (2)$$

$R(\theta, \phi)$ is a matrix describing the effect of a spatial orientation (elevation $\theta$, azimuth $\phi$) of a respective wireless terminal 40A, 40B on the corresponding MIMO transmission. In other terms, the matrix specifies reception by the spatially oriented wireless terminal 40A, 40B. Based on actual values $\theta_{1/2}$, $\phi_{1/2}$ for the respective estimated spatial orientation $\theta$, $\phi$, the inverse matrix $R^{-1}(\theta_{1/2}, \phi_{1/2})$ can be formed and used to compensate for the effect of this spatial orientation on the polarization division multiplexed MIMO transmissions.

Interference-free MIMO transmissions to the wireless terminals 40A, 40B will result if the following conditions are satisfied:

$$w_1 R(\theta_1, \phi_1) H_1 f_2 = 0 \quad (3)$$

$$w_2 R(\theta_2, \phi_2) H_2 f_1 = 0 \quad (4)$$

Equations (3), (4) represent the mutual polarization crosstalk of the polarization division multiplexed MIMO transmissions. The equations describe, in mathematical terms, signal propagation/processing acting on transmission signals which are incorrectly received by the wireless terminal 40A, 40B.

For example, equation (3) reflects (a similar analysis may be made for equation (4)):
- precoding of the second MIMO transmission ($f_2$) by the access node 20,
- power leakage into the first MIMO transmission ($H_1$),
- reception by the spatially oriented first wireless terminal 40, 40A ($R(\theta_1, \phi_1)$), and
- compensation of the spatial orientation ($w_1$) of (and by) the first wireless terminal 40, 40A.

For interference-free polarization division multiplexed MIMO transmissions, polarization crosstalk needs to vanish, as is reflected in equations (3) and (4).

Based on these system requirements, the access node 20 may determine precoding vectors $f_{1/2}$ for the first/second MIMO transmission as null-spaces of the channel matrices $H_{2/1}$ corresponding to the second/first MIMO transmission:

$$w_2 R(\theta_2, \phi_2) H_2 f_1 = 0 \qquad |(2) \to (4)$$

$$[-i 1] R^{-1}(\theta_2, \phi_2) R(\theta_2, \phi_2) H_2 f_1 = 0 \qquad |R^{-1} R = 1$$

$$[-i\ 1] H_2 f_1 = 0$$

$$\Rightarrow f_1 = L\{[-i\ 1] H_2 [1\ i]^T\} \quad (5)$$

$$w_1 R(\theta_1, \phi_1) H_1 f_2 = 0 \qquad |(1) \to (3)$$

$$[1 - i] R^{-1}(\theta_1, \rho_1) R(\theta_1, \phi_1) H_1 f_2 = 0 \qquad |R^{-1} R = 1$$

$$[1 - i] H_1 f_2 = 0$$

$$\Rightarrow f_2 = L\{[1 - i] H_1 [i 1]^T\} \quad (6)$$

where $L\{\cdot\}$ denotes the null-space of its argument.

The vectors $[1\ i]^T$ and $[i\ 1]^T$ are introduced to obtain a more robust system against rotation of the wireless terminals 40A, 40B. The particular choice of $[1\ i]^T$ and $[i\ 1]^T$ is because for rotations along (or close to) an axis perpendicular to the direction of the access node 20, there is no need to include $R^{-1}(\theta, \rho)$ in the equations. Although $R(\theta, \rho)$ is still present in the equations, it needs not to be compensated if, and only if, the particular choice specified above is made. Thus, this reduces the computational burden of the receiving wireless terminals 40A, 40B and improves robustness against rotation, as mentioned above. The choice of $[1\ i]^T$ and $[i\ 1]^T$ corresponds to right-hand-side, RHS, and left-hand-side, LHS, circularly polarized transmissions, respectively (cf.

the preceding vectors), which are guaranteed to be orthogonal.

Based on precoding vectors $f_{1/2}$ defined as in equations (5) and (6), respectively, the access node 20 may perform precoding of the polarization division multiplexed MIMO transmissions using a transmit vector s:

$$s = f_1 x^1 + f_2 x_2 \quad (7)$$

where $x_{1/2}$: data signals intended for the first/second wireless terminals 40A, 40B

The first and second MIMO transmissions are respectively received 31 by the first and second wireless terminals 40A, 40B at step 31 of the method 30:

$$Y_{1/2} = R(\theta_{1/2}, \phi_{1/2}) [H_{1/2} s + n] \quad (8)$$

where $H_{1/2}$: channel matrix (reflecting both polarization planes)
n: noise vector (Additive White Gaussian Noise, AWGN)
$y_{1/2}$: receive vectors at the first/second wireless terminals 40A, 40B

At step 32 of the method 30, the receiving wireless terminal 40A, 40B estimates 32 a spatial orientation $\theta_{1/2}$, $\phi_{1/2}$ of its antenna array 42 based on measurements performed by at least one sensor 43 of the receiving wireless terminal 40A, 40B.

The actual spatial orientation $\theta$, $\phi$ of the antenna array 42 of the receiving wireless terminal 40, 40A, 40B may impair polarization orthogonality of the polarization division multiplexed first and second MIMO wireless transmissions, and thus imply the mutual polarization crosstalk of these MIMO wireless transmissions.

At step 33 of the method 30, the receiving wireless terminal 40A, 40B filters out 33 a polarization crosstalk from the received MIMO transmission, based on the estimated spatial orientation $\theta_{1/2}$, $\phi_{1/2}$. The polarization crosstalk affecting the received MIMO transmission is associated with the spatial orientation $\theta$, $\phi$ of the antenna array 42 of the receiving wireless terminal 40A, 40B.

By leveraging its estimated spatial orientation information $\theta_{1/2}$, $\phi_{1/2}$, the receiving wireless terminal 40, 40A, 40B may adapt its respective receiver so that a signal-to-interference ratio is maintained above an acceptable threshold even if the respective wireless terminal 40, 40A, 40B is rotated.

Polarization orthogonality of the polarization division multiplexed first and second MIMO wireless transmissions is thus re-established by compensating for the rotation of the respective wireless terminal 40A, 40B. More specifically, this may be realized by rotating a receive polarization state of the received MIMO transmission based on digital signal processing, using the compensation matrices $w_{1/2}$.

Maintaining polarization orthogonality locally at each wireless terminal 40A, 40B implies plies less frequent pilot transmissions for acquiring channel state $H_{1/2}$, since the serving access node 20 needs to recalculate its precoding vectors $f_{1/2}$ only if the respective wireless terminal 40A, 40B is unable to compensate for its respective spatial orientation $\theta_{1/2}$, $\phi_{1/2}$. As a result, a downlink signaling structure in the context of multi-user MIMO transmission is obtained which requires much less signaling exchange between the respective wireless terminal 40A, 40B and the access node 20. Without this local compensation capability, rotations of the involved wireless terminals 40A, 40B would imply pilot transmissions and recalculation of precoding vectors.

In downlink communications, for instance, conventionally different time/frequency/code resources are used to serve multiple users/devices being located in a same (or similar) direction as seen from a serving access node. However, based on polarization division multiplex, multiple users/devices can be served simultaneously without such additional resources. The access node may thus transmit a single beam comprising two MIMO transmissions having different transmit polarization states to serve two users/devices simultaneously. Polarization effects in the spatial channel and spatial orientations of the involved wireless terminals result in respective receive polarization states at the served wireless terminals 40A, 40B. These receive polarization states should be different, and ideally mutually orthogonal, to separate the polarization division multiplexed MIMO transmissions.

The method enables the wireless terminal to maintain polarization orthogonality in both downlink and uplink communications.

An "access node" as used herein may refer to a serving radio node of a wireless communication network. In particular, the term may refer to a 3G, 4G or 5G base station (typically abbreviated as NB, eNB, or gNB).

A "wireless terminal" as used herein may refer to a mobile device comprising a radio interface by which Wide Area Network, WAN, connectivity to a wireless communication network, in particular to a cellular network, may be established and maintained. Examples for such mobile devices comprise smartphones and computers.

A "wireless communication network" as used herein may refer to a communication network which comprises wireless/radio links between access nodes of the wireless communication network and wireless terminals attached to the wireless communication network, besides fixed network links interconnecting the functional entities of the wireless communication network's infrastructure. Examples for such networks comprise Universal Mobile Telecommunications System, UMTS, and Third Generation Partnership, 3GPP, Long Term Evolution, LTE, cellular networks, New Radio, NR, 5G networks, etc. Generally, various technologies of wireless networks may be applicable and may impart WAN connectivity.

A "time-frequency resource" as used herein may refer to a smallest element of resource allocation assignable by an access node to a wireless terminal being attached to this access node. For instance, a time-frequency resource in LTE downlink communication is defined as a physical resource block, PRB, comprising twelve spectrally consecutive OFDM subcarriers (frequency domain) for a duration of 0.5ms (time domain). The concept may also be applied to code resources such as those used in CDMA transmission, for example.

"Multiple input multiple output" or "MIMO" as used herein may refer to exploiting multipath propagation between multiple transmit and receive antennas in radio transmission. MIMO wireless transmission may be used to increase transmission capacity, by dividing data into separate streams being transmitted simultaneously over the same air interface. When the individual streams are assigned to different wireless terminals, this is called Multi-User MIMO, MU-MIMO. When the individual streams are assigned to a single wireless terminal, this is called Single-User MIMO, SU-MIMO, and may refer to exploiting multipath propagation in a single link between a transmit phased antenna array and a receive phased antenna array to multiply transmission capacity.

An "antenna array" or a "phased antenna array" as used herein may refer to an antenna array whose antenna elements transmit or receive a plurality of radio waves having relative amplitudes and phases such that a pattern of constructive and destructive interference forms a directional wavefront, i.e., a beam having a particular direction of propagation, without moving the antennas.

An "overlap" as used herein may refer to an at least partial match.

A "spatial channel" as used herein may refer to a directional signal transmission (or reception) as a result of controlling (or detecting) a phase and relative amplitude of the signal at each antenna element of a phased antenna array in such a way that signals at particular angles experience constructive interference while others experience destructive interference.

"Polarization" as used herein may refer to a property of a propagating electromagnetic wave, whose associated electric field has a transversal (or perpendicular) oscillation direction with respect to a propagation direction of the wave.

A "polarization plane" as used herein may refer to a property of an antenna element of an antenna or an antenna array. More specifically, the term "polarization plane" may describe a direction of the electric field vector of waves emitted by such an antenna element, or equivalently a direction of the electric field vector of waves incident on such an antenna element which maximizes a reception. For example, cross-polarized antennas or antenna arrays comprise a plurality of antenna elements, and each antenna element is associated with one of two mutually orthogonal polarization planes. The designation as "planes" reflects that the polarization planes of an antenna or an antenna array are typically not subject to change.

A "polarization state" as used herein may refer to a property of an electromagnetic wave. More specifically, the term "polarization state" may describe a direction of an electric field vector of the wave in a plane normal to a propagation direction of the wave. In other terms, the "polarization state" represents an oscillation direction of the electric field of the propagating wave. The designation as a "state" reflects that a polarization state of a wave is subject to change, for instance due to polarization effects in the channel.

A "transmit polarization state" as used herein may refer to a wave's transmit-side polarization state that is constituted through a controlled split of a transmit power onto two mutually orthogonal polarization planes of an antenna array associated with the transmitter. Accordingly, transmit polarization states of MIMO transmissions may be realized by appropriate precoding.

A "receive polarization state" as used herein may refer to a wave's receive-side polarization state that is constituted through a split of the incident wave's power onto two mutually orthogonal polarization planes of an antenna array associated with the receiver. Receive polarization states of polarization division multiplexed MIMO transmissions must be "different" enough to allow for proper separation and operation of the transmissions: The less mutually orthogonal (i.e., different) the involved MIMO transmissions are in terms of their receive polarization states, the poorer their separation is, resulting in the MIMO transmissions leaking into each other as polarization crosstalk.

Accordingly, receive polarization states may be considered "different" enough by the receiving wireless terminal 40A, 40B if the received MIMO transmission may still successfully be decoded after separation according to an acceptable bit error ratio. Each wireless terminal may assess this individually for its corresponding MIMO transmission. If both receive polarization states are available in one place, for instance when polarization division multiplexing uplink MIMO transmissions, the receive polarization states may be considered "different" enough if their intermediate angle exceeds a threshold angle which corresponds to an acceptable bit error ratio.

"Channel state" as used herein may refer to information describing power coupling between pairs of antenna elements associated with a transmitter and a receiver. Channel state may describe a combined effect of, for example, scattering, fading, and power decay with distance, expressed in terms of a relative phase delay and a relative attenuation. As such, channel state may be considered as a complex-valued channel impulse response. If the involved antenna arrays comprise antenna elements being associated with mutually orthogonal polarization planes, channel state may be generalized to additionally describe power coupling between pairs of antenna elements associated with the different mutually orthogonal polarization planes.

Figure 2:
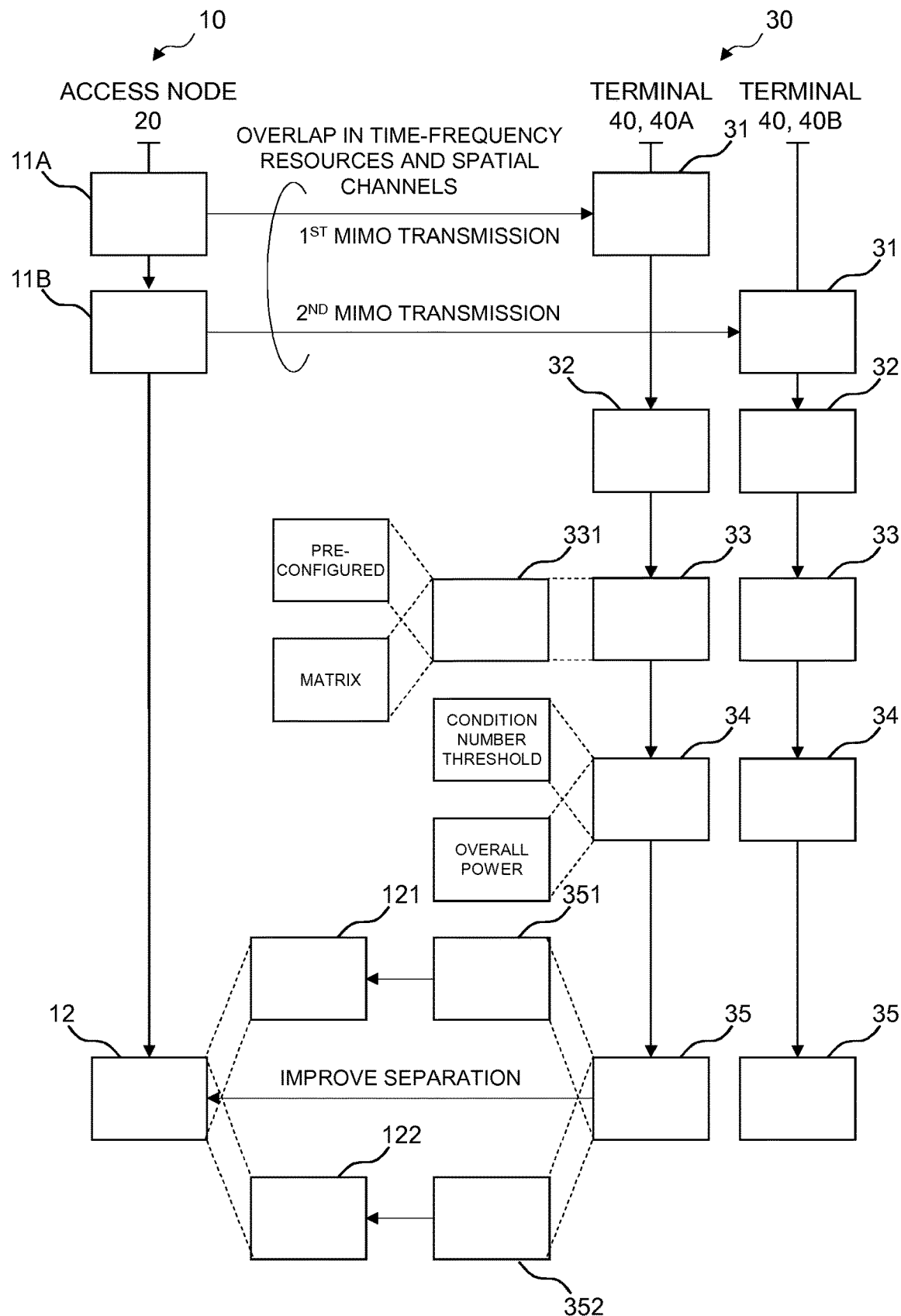
FIG. 2 illustrates possible variants of the methods 10, 30 of FIG. 1.

FIG. 2 illustrates possible variants of the methods 10, 30 of FIG. 1.

The step 33 of the wireless terminal 40A, 40B filtering out 33 the polarization crosstalk based on the estimated spatial orientation $\theta_{1/2}$, $\phi_{1/2}$ may further comprise the wireless terminal 40A, 40B filtering out 331 the polarization crosstalk based on a terminal-specific filter function $R^{-1}(\theta, \phi)$ using the estimated spatial orientation $\theta_{1/2}$, $\phi_{1/2}$ as an input.

The previously introduced compensation matrices w1/2 comprising the filter function $R^{-1}(\theta, \phi)$ may be used by the respective wireless terminal 40A, 40B to compensate for its spatial orientation $\theta_{1/2}$, $\phi_{1/2}$, by multiplying corresponding receive vectors $y_{1/2}$ and compensation matrices $w_{1/2}$, ideally resulting in polarization orthogonality of the polarization division multiplexed MIMO transmissions, and thus in filtering out of the undesired polarization crosstalk:

$$\underline{w}_1 \underline{y}_1 = \underline{w}_1 \{R(\theta_1, \phi_1) H_1(\underline{f}_1 x_1 + \underline{f}_2 x_2) + \underline{n}\} \quad |(3), (7) \to (8)$$

$$= \underline{w}_1 \{R(\theta_1, \phi_1) H_1 \underline{f}_1 x_1 + \underline{n}\} \quad |(1) \to (8)$$

$$= [1 - i] \underline{R}^{-1}(\theta_1, \phi_1) \{R(\theta_1, \phi_1) H_1 \underline{f}_1 x_1 + \underline{n}\}$$

$$\Rightarrow 1/2 \underline{w}_1 \underline{y}_1 = x_1 + [i - 1] \underline{R}^{-1}(\theta_1, \phi_1) \underline{n} \quad (9)$$

$$\underline{w}_2 \underline{y}_2 = \underline{w}_2 \{R(\theta_2, \phi_2) H_2(\underline{f}_1 x_1 + \underline{f}_2 x_2) + \underline{n}\} \quad |(4), (7) \to (8)$$

$$= \underline{w}_2 \{R(\theta_2, \phi_2) H_2 \underline{f}_2 x_2 + \underline{n}\} \quad |(2) \to (8)$$

$$= [-i\ 1] \underline{R}^{-1}(\theta_2, \phi_2) \{R(\theta_2, \phi_2) H_2 \underline{f}_2 x_2 + \underline{n}\} \quad |(2) \to (8)$$

$$\Rightarrow 1/2 \underline{w}_2 \underline{y}_2 = x_2 [-i\ 1] \underline{R}^{-1}(\theta_2, \phi_2) \underline{n} \quad (10)$$

From this, it can be seen that by designing the precoding vectors $f_{1/2}$ according to the above-mentioned system requirements for interference-free transmission, this needs to be done only once, no matter if the receiving wireless terminals 40A, 40B are rotated or not. Then, aided by the estimated spatial orientation $\theta_{1/2}$, $\phi_{1/2}$, the receiving wireless terminals 40A, 40B can compensate for their own rotation without any involvement of the access node 20.

The filter function $R^{-1}(\theta, \phi)$ may be pre-configured in the wireless terminal 40, 40A.

The filter function $R^{-1}(\theta, \phi)$ may be theoretically derived or measured in various ways, including factory calibration. In particular, the filter function $R^{-1}(\theta, \phi)$ may be pre-configured as a look-up table, LUT.

By pre-configuring the terminal-specific filter function $R^{-1}(\theta, \phi)$ in the respective wireless terminal 40A, 40B, a terminal-specific effect of the spatial orientation $\theta_{1/2}$, $\phi_{1/2}$ of the antenna array 42 of the respective wireless terminal 40A, 40B on polarization orthogonality of the (first) MIMO transmission may be mitigated or even eliminated.

The filter function $R^{-1}(\theta, \phi)$ may comprise a filter matrix. The filter function $R^{-1}(\theta, \phi)$ is only a matrix for a given spatial orientation $\theta_{1/2}$, $\phi_{1/2}$, i.e. for given values of azimuth $\theta$ and elevation $\phi$, and otherwise a function from $R^2$ to $C^4$.

The method 30 may further comprise a step of determining 34 a condition of an channel matrix $R^{-1}(\theta_{1/2}, \phi_{1/2}) H_{1/2}$, which represents the filtered channel.

The person skilled in the art recognizes from equations (9) and (10) specified above instances of noise enhancement whenever the respective filter matrix $R^{-1}(\theta_{1/2}, \phi_{1/2})$ is ill-conditioned. Accordingly, the receiving wireless terminal 40A, 40B is able to determine when it cannot compensate for its spatial orientation $\theta_{1/2}$, $\phi_{1/2}$ by itself, but must request assistance from the access node 20.

Determining 34 a condition of an channel matrix allows for verification that the wireless terminal is capable of maintaining the polarization orthogonality of the involved MIMO transmissions based on local measures.

The method 30 may further comprise, in response to determining 34 that the channel matrix $R^{-1}(\theta_{1/2}, \phi_{1/2}) H_{1/2}$ is ill-conditioned: triggering 35 the access node 20 to improve an isolation of the MIMO transmissions.

Triggering the access node to improve an isolation of the MIMO transmissions allows for maintaining the polarization orthogonality of the involved MIMO transmissions if local measures of the involved wireless terminal do not suffice. In other terms, the wireless terminal is provided with an ability to request assistance from the access node 20 in maintaining the polarization orthogonality of the involved MIMO transmissions.

Generally, the condition number of a function with respect to an input argument measures how much the output value of the function can change for a small change in the input argument. If the function is a matrix A, having a large condition number means that the computation of its inverse $A^{-1}$ is prone to large numerical errors: The higher the condition number, the greater the error in the calculation. Thus, the matrix may be considered to be ill-conditioned if $A^{-1}A = 1$ may not be calculated with acceptable precision. For instance, when forming the matrix product $R^{-1}(\theta_{1/2}, \phi_{1/2}) R(\theta_{1/2}, \phi_{1/2})$, the matrix $R(\theta_{1/2}, \phi_{1/2})$ may be termed as ill-conditioned if the product deviates from a identity matrix according to a given precision.

Thus, the channel matrix $R^{-1}(\theta_{1/2}, \phi_{1/2}) R(\theta_{1/2}, \phi_{1/2}) H_{1/2}$ representing the filtered channel may be ill-conditioned if a condition number of an inverse of the filter matrix R exceeds a condition number threshold, and/or if an overall power of the inverse of the filter matrix (R) is less than an overall power threshold.

If, owing to such conditions, local compensation of the spatial orientation $\theta_{1/2}$, $\phi_{1/2}$ of the receiving wireless terminal 40A, 40B may not be meaningful anymore, assistance by the access node 20 may be requested by the respective wireless terminal 40A, 40B.

In this context, it may be beneficial to reverse the roles of the involved wireless terminals 40A, 40B in terms of the respective polarization:

$$w_1 = [-i1]R^{-1}(\theta_1, \phi_1) \quad (1')$$

$$w_2 = [1-i]R^{-1}(\theta_2, \phi_2) \quad (2')$$

$$f_1 = L\{[1-i]H_2[i1]^T\} \quad (5')$$

$$f_2 = L\{[-i1]H_1[1i]^T\} \quad (6')$$

This may result in overall power gain and provide the access node 20 with an additional degree of freedom with respect to precoding, provided the receiving wireless terminals 40A, 40B are informed accordingly, consistent compensation matrices $w_{1/2}$ must be used throughout the system.

The step of triggering 35 the access node 20 to improve an isolation of the MIMO transmissions may further comprise: triggering 351 the access node 20 to use a different first set of time-frequency resources, or triggering 352 the access node 20 to use different precoding vectors for the MIMO transmissions.

While the step of triggering 351 assumes that polarization division multiplexing of the involved MIMO transmissions is no longer possible, the alternative step of triggering 352 expects that polarization division multiplexing of the involved MIMO transmissions may be continued subject to a modified precoding.

The method 30 may further comprise a step of the respective wireless terminal 40A, 40B indicating (not shown) to the access node 20 a capability to filter out a polarization crosstalk from the received MIMO transmission based on the estimated spatial orientation $\theta_{1/2}$, $\phi_{1/2}$ of the antenna array 42 of the respective wireless terminal 40A, 40B.

Correspondingly, the method 10 may further comprise a step of the access node 20 receiving (not shown) a signal from at least one of the wireless terminals 40A, 40B being indicative of a capability to filter out a polarization crosstalk from the respective received MIMO transmission based on the spatial orientation $\theta_{1/2}$, $\phi_{1/2}$ of the antenna array 42 of the respective wireless terminal 40A, 40B.

Knowing a wireless terminal's 40A, 40B relevant capability provides the access node 20 with an additional degree of freedom for maintaining polarization orthogonality. For instance, the access node 20 may be triggered to schedule more sparse pilot transmissions if both involved wireless terminals 40A, 40B have indicated this filtering capability. The serving access node 20 may take this into account in the user scheduling. The involved wireless terminals 40A, 40B, on the other hand, may experience an increased data throughput owing to less channel sounding, which may consume less time-frequency resources. Alternatively or additionally, the involved wireless terminal's 40A, 40B filtering capability may be activated or deactivated upon request by the serving access node 20.

The method 10 may further comprise receiving 12, from any one of the wireless terminals 40A, 40B, a trigger to improve an isolation of the MIMO transmissions. This step may further comprise receiving 121 a trigger to use a different set of time-frequency resources, or receiving 122 a trigger to use different precoding vectors for the MIMO transmissions.

The method steps 12, 121 and 122 carried out by the access node 20 correspond to the method steps 35, 351 and 352 performed by the wireless terminal 40A, 40B, wherefore similar technical effects and advantages apply.

Figure 3:
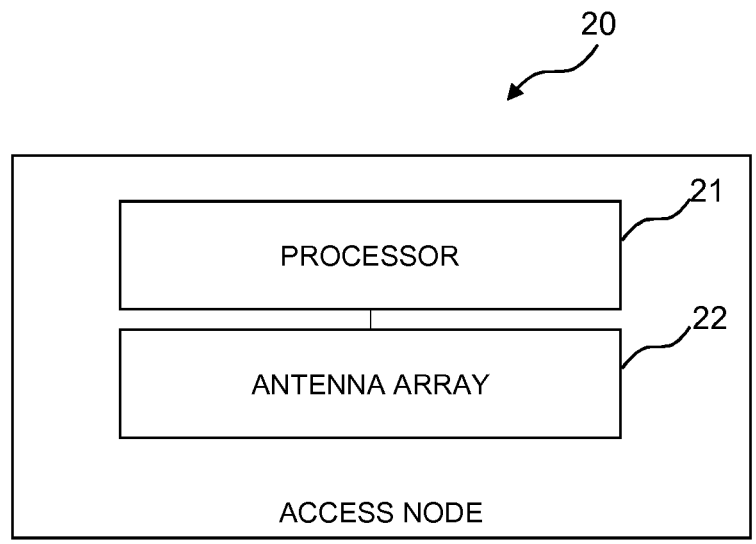
FIG. 3 schematically illustrates a wireless terminal 40.

FIG. 3 schematically illustrates a wireless terminal 40.

The wireless terminal 40, 40A, 40B, comprises: at least one sensor 43; an antenna array 42 having antenna elements being associated with respective ones of two mutually orthogonal polarization planes; and a processor 41. The processor 41 is arranged for receiving 31 a multiple input multiple output, MIMO, transmission from an access node 20 of the wireless communication network; estimating 32 a spatial orientation $\theta_1$, $\phi_1$ of the antenna array 42 of the wireless terminal 40, 40A based on measurements performed by the at least one sensor 43 of the wireless terminal 40, 40A; and based on the estimated spatial orientation $\theta_{1/2}$, $\phi_1$, filtering out 33 a polarization crosstalk from the received MIMO transmission. The polarization crosstalk is associated with the spatial orientation $\theta_1$, $\phi_1$ of the antenna array 42 of the receiving wireless terminal 40, 40A.

In particular, the at least one sensor 43 of the receiving wireless terminal 40, 40A, 40B may be an inertial measurement unit, IMU, measuring at least rotational acceleration and thus enabling estimation of a spatial orientation $\theta_1$, $\phi_1$ of the receiving wireless terminal 40, 40A, 40B, or more specifically, of its antenna array 42. The wireless terminals 40A, 40B may thus be denoted as IMU-assisted terminals.

The wireless terminal 40, 40A, 40B may be arranged for performing the method 30 of various embodiments.

The technical effects and advantages described in relation with the method 30 of performing radio transmissions in a wireless communication network equally apply to the wireless terminal 40, 40A, 40B having corresponding features.

Figure 4:
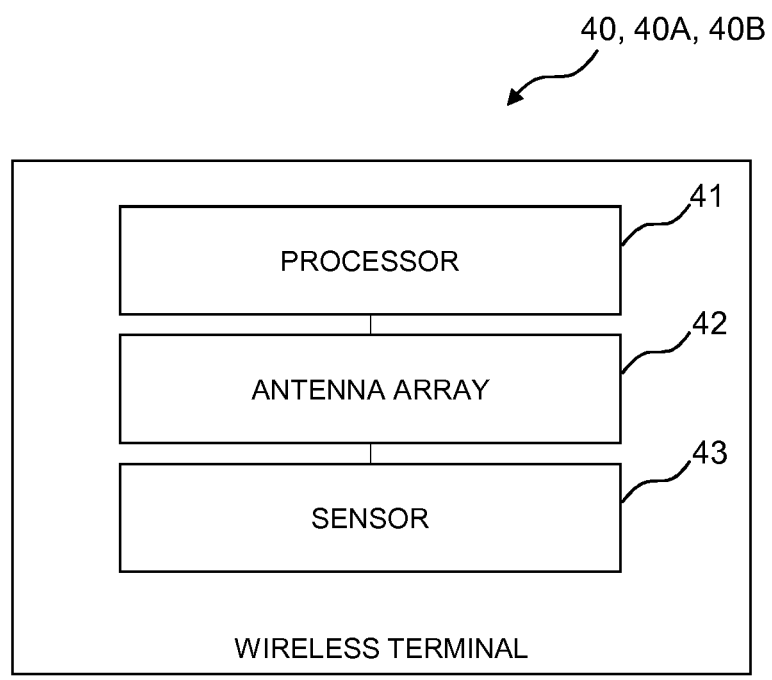
FIG. 4 schematically illustrates an access node 20.

FIG. 4 schematically illustrates an access node 20 of a wireless communication network.

The access node 20 comprises a processor 21 being arranged for controlling 11A a first multiple input multiple output, MIMO, transmission between the access node 20 and a first wireless terminal 40, 40A to use a first set of time-frequency resources, to use a first MIMO spatial channel, and to use a first transmit polarization state. The processor 21 is further arranged for controlling 11B a second MIMO transmission between the access node 20 and a second wireless terminal 40, 40B to use a second set of time-frequency resources which at least partially overlaps the first set of time-frequency resources, to use a second MIMO spatial channel which at least partially overlaps the first MIMO spatial channel, and to use a second transmit polarization state which differs from the first transmit polarization state.

The controlling 11A, 11B of the MIMO transmissions comprises precoding the MIMO transmissions to allow for filtering out mutual polarization crosstalk from the MIMO transmissions, by the receiving wireless terminal 40A, 40B.

The access node 20 may further comprise an antenna array 22 having antenna elements being associated with respective ones of two mutually orthogonal polarization planes.

The access node 20 may be arranged for performing the method 10 according to various embodiments.

The technical effects and advantages described in relation with the method of controlling radio transmissions in a wireless communication network equally apply to the access node having corresponding features.

The invention claimed is:

1. A method of performing radio transmissions in a wireless communication network, the method comprising, in a wireless terminal:
receiving a multiple input multiple output, MIMO, transmission from an access node of the wireless communication network;
estimating a spatial orientation of an antenna array of the wireless terminal based on measurements performed by at least one sensor of the wireless terminal; and
based on the estimated spatial orientation, filtering out a polarization crosstalk from the received MIMO transmission,
the polarization crosstalk being associated with the spatial orientation of the antenna array of the wireless terminal.

2. The method of claim 1, wherein
the MIMO transmission
uses a first set of time-frequency resources,
uses a first MIMO spatial channel,
uses a first receive polarization state; and
the polarization crosstalk is associated with a further MIMO transmission by the access node, wherein the further MIMO transmission
uses a second set of time-frequency resources which at least partially overlaps the first set of time-frequency resources,
uses a second MIMO spatial channel which at least partially overlaps the first MIMO spatial channel, and
uses a second receive polarization state which differs from the first receive polarization state.

3. The method of claim 2, wherein
based on the estimated spatial orientation, the wireless terminal filtering out the polarization crosstalk further comprises:
the wireless terminal filtering outer the polarization crosstalk based on a terminal-specific filter function using the estimated spatial orientation as an input.

4. The method of claim 3, wherein
the filter function is pre-configured in the wireless terminal.

5. The method of claim 3, wherein
the filter function comprises a filter matrix.

6. The method of claim 5, further comprising:
determining a condition of a channel matrix representing the filtered channel.

7. The method of claim 6, further comprising:
in response to determining that the channel matrix is ill-conditioned: triggering the access node to improve an isolation of the MIMO transmissions.

8. The method of claim 7, wherein
the channel matrix is ill-conditioned if a condition number of an inverse of the filter matrix exceeds a condition number threshold.

9. The method of claim 7, wherein:
the channel matrix is ill-conditioned if an overall power of the inverse of the filter matrix is less than an overall power threshold.

10. The method of claim 7, wherein
triggering the access node to improve an isolation of the MIMO transmissions further comprises:
triggering the access node to use a different first set of time-frequency resources.

11. The method of claim 7, wherein
triggering the access node to improve an isolation of the MIMO transmissions further comprises:
triggering the access node to use different precoding vectors for the MIMO transmissions.

12. A wireless terminal, comprising:
at least one sensor;
an antenna array having antenna elements being associated with respective ones of two mutually orthogonal polarization planes; and
a processor being arranged for
receiving a multiple input multiple output, MIMO, transmission from an access node of the wireless communication network;
estimating a spatial orientation of the antenna array of the wireless terminal based on measurements performed by the at least one sensor of the wireless terminal; and
based on the estimated spatial orientation, filtering out a polarization crosstalk from the received MIMO transmission,
the polarization crosstalk being associated with the spatial orientation of the antenna array of the wireless terminal.

13. A method of controlling radio transmissions in a wireless communication network, the method comprising in an access node of the wireless communication network:
controlling a first multiple input multiple output, MIMO, transmission between the access node and a first wireless terminal
to use a first set of time-frequency resources,
to use a first MIMO spatial channel, and
to use a first transmit polarization state;
controlling a second MIMO transmission between the access node and a second wireless terminal
to use a second set of time-frequency resources which at least partially overlaps the first set of time-frequency resources,
to use a second MIMO spatial channel which at least partially overlaps the first MIMO spatial channel, and
to use a second transmit polarization state which differs from the first transmit polarization state;
the controlling of the MIMO transmissions comprising precoding the MIMO transmissions to allow for a filtering of mutual polarization crosstalk of the MIMO transmissions,
the respective polarization crosstalk being associated with a spatial orientation of an antenna array of the respective wireless terminal.

14. The method of claim 13, wherein precoding the MIMO transmissions further comprises:
the first MIMO transmission being mapped into a null-space of a second channel matrix of the second MIMO transmission, and
the second MIMO transmission being mapped into a null-space of a first channel matrix of the first MIMO transmission.

15. The method of claim 13, further comprising
receiving, from any one of the wireless terminals, a trigger to improve an isolation of the MIMO transmissions.

16. The method of claim 15, wherein
receiving, from any one of the wireless terminals, a trigger to improve an isolation of the MIMO transmissions further comprises:
receiving a trigger to use a different set of time-frequency resources.

17. The method of claim 15, wherein
receiving, from any one of the wireless terminals, a trigger to improve an isolation of the MIMO transmissions further comprises:
receiving a trigger to use different precoding vectors for the MIMO transmissions.

18. The method of claim 14, wherein
precoding the MIMO transmissions further comprises:
precoding the first MIMO transmission based on a vector of and on the second channel matrix of the second MIMO transmission, and
precoding the second MIMO transmission based on a vector of and on the first channel matrix of the first MIMO transmission.

\* \* \* \* \*